(12) United States Patent
Sicard

(10) Patent No.: US 11,310,641 B2
(45) Date of Patent: Apr. 19, 2022

(54) ENTITLEMENT SERVER CONNECTED ESIMS

(71) Applicant: HEWLETT PACKARD ENTERPRISE DEVELOPMENT LP, Houston, TX (US)

(72) Inventor: Jerome Sicard, Berkeley Heights, NJ (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/423,488

(22) Filed: May 28, 2019

(65) Prior Publication Data

US 2020/0260241 A1 Aug. 13, 2020

Related U.S. Application Data

(60) Provisional application No. 62/803,576, filed on Feb. 10, 2019.

(51) Int. Cl.
| | |
|---|---|
| H04W 4/50 | (2018.01) |
| H04W 12/40 | (2021.01) |
| H04W 84/04 | (2009.01) |

(52) U.S. Cl.
CPC ............ *H04W 4/50* (2018.02); *H04W 12/40* (2021.01); *H04W 84/042* (2013.01)

(58) Field of Classification Search
None
See application file for complete search history.

(56) References Cited

U.S. PATENT DOCUMENTS

| | | | |
|---|---|---|---|
| 2009/0163175 A1* | 6/2009 | Shi .................... | H04W 12/0608 455/411 |
| 2013/0310001 A1* | 11/2013 | Midkiff ................ | H04W 8/205 455/411 |
| 2014/0329502 A1* | 11/2014 | Lee ................... | H04W 12/0023 455/411 |
| 2015/0349825 A1* | 12/2015 | Lee ...................... | H04W 8/205 455/558 |
| 2016/0057725 A1* | 2/2016 | Suh ........................ | G06Q 50/30 455/435.1 |
| 2017/0155434 A1 | 9/2017 | Lindheimer et al. | |
| 2017/0353851 A1* | 12/2017 | Gonzalez ............ | H04L 63/0876 |
| 2018/0063111 A1 | 3/2018 | Vasudevan et al. | |
| 2018/0176768 A1* | 6/2018 | Baek ..................... | H04W 8/205 |
| 2018/0352417 A1* | 12/2018 | Butler ............... | H04M 3/42144 |
| 2019/0007082 A1 | 1/2019 | Dumoulin et al. | |

(Continued)

OTHER PUBLICATIONS

"GSMA Remote SIM Provisioning specification, SGP.22, version 2.2", Sep. 1, 2017, 264 pages.

(Continued)

*Primary Examiner* — Ernest G Tacsik
(74) *Attorney, Agent, or Firm* — Nolte Lackenbach Siegel

(57) ABSTRACT

Systems and methods are provided for activating an embedded subscriber identity module (eSIM) device. One method may include initiating at least one device comprising an eSIM; connecting the eSIM to at least one of an entry point of a Mobile Network Operator (MNO) and an entitlement configuration server (ECS); activating, authenticating, and/or authorizing the eSIM; and connecting the eSIM with a cellular data service or a data network of the MNO.

22 Claims, 5 Drawing Sheets

(56) References Cited

U.S. PATENT DOCUMENTS

| | | | |
|---|---|---|---|
| 2019/0069162 A1* | 2/2019 | Lindheimer | H04L 63/0876 |
| 2019/0223003 A1* | 7/2019 | Balasubramanian | H04L 63/0853 |
| 2019/0327610 A1* | 10/2019 | Rajadurai | H04W 4/00 |
| 2019/0349743 A1* | 11/2019 | Hamblet | H04M 15/64 |

OTHER PUBLICATIONS

Microsoft Mobile Plans Integration Guide, Version 1.00, Jul. 2018.

Sakimura et al., "OpenID Connect Core Protocol Specification 1.0", available online at <https://openid.net/specs/openid-connect-core-1_0.html>, Nov. 8, 2014, 86 pages.

Business News in Africa, "IDEMIA to Partner with Microsoft to Facilitate eSIM Management for Windows 10 Enterprise Devices," Sep. 28, 2018, https://businessnewsinafrica.blogspot.com/2018/09/idemia-to-partner-with-microsoft-to.html.

Grabham, D., "What is an eSIM and what does it mean for your new iPhone, iPad or Pixel?," Dec. 28, 2018, https://www.pocket-lint.com/phones/news/134640-what-is-an-esim-and-how-will-it-change-connected-devices-for-the-better.

GSMA, "Remote Provisioning Architecture for Embedded UICC," Technical Specification, Version 3.2, Jun. 27, 2017.

GSMA, "The What and How of Remote SIM Provisioning," eSIM Whitepaper, Mar. 2018.

NXP USA, Inc., "NXP Ushers in New Era of eSIM-enabled Devices for 5G and IoT With Industry's First Single NFC and Secure Element Monolithic Chip," Feb. 28, 2018, http://media.nxp.com/phoenix.zhtml?c=254228&p=irol-newsArticle&ID=2335177.

Trivore Corp., "Device Entitlement Service," retrieved online Jan. 24, 2019, https://trivore.com/trivore-device-entitlement-service/.

* cited by examiner

ENTITLEMENT SERVER CONNECTED ESIMS

CROSS-REFERENCE TO RELATED APPLICATIONS

This application claims the benefit of U.S. Prov. Appl. No. 62/803,576, filed Feb. 10, 2019. This application is incorporated herein by reference in its entirety to the extent consistent with the present application,

BACKGROUND

Mobile Network Operator (MNO) service portals offer standard Web-based HTML-JavaScript pages to end-users for a step-by-step activation of services for mobile device Embedded Subscriber Identity Modules (eSIMs). The activation can involve complex end-user operations like scanning a QR-code and user identification via proprietary authentication steps that are MNO-dependent. The end-user authentication is presently based on the standard OpenID framework and control of the authentication and activation process is handled using standard techniques like HTTP redirect.

BRIEF DESCRIPTION OF THE DRAWINGS

The present disclosure is best understood from the following detailed description when read with the accompanying Figures. It is emphasized that, in accordance with the standard practice in the industry, various features are not drawn to scale and may omit processes commonly performed in conjunction with the exemplary flow processes. The process flow diagrams are illustrative only and are provided in order to demonstrate the various features for clarity of discussion.

DETAILED DESCRIPTION

Figure 1:
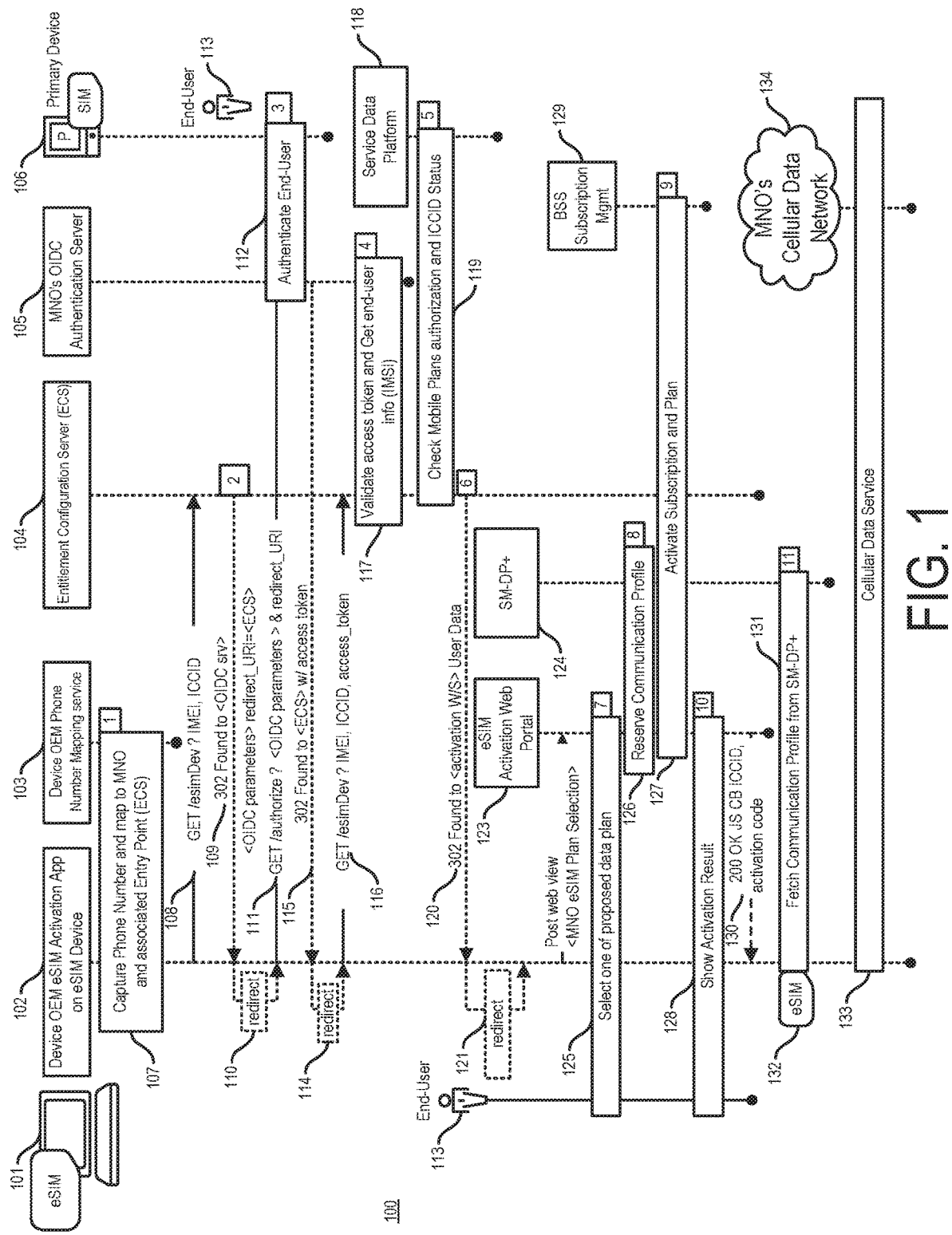
FIG. 1. is an illustrative flow diagram of an example process flow for activating an eSIM device through an ECS with authentication based on the standard OpenID framework and control of the authentication and activation handled by standard techniques like HTTP redirect.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Further, as used here, "entitlement server", "designated entitlement server", "designated entitlement server gateway", "ES", "DEG" and may all be used interchangeably with "entitlement configuration server" ("ECS") and "designated entitlement configuration server" ("DECS"). An DEG is an illustrative example of an entitlement configuration server.

As discussed above, Mobile Network Operator (MNO) service portals offer standard Web-based HTML-JavaScript pages to end-users for a step-by-step activation of services for mobile device embedded Subscriber Identity Modules (eSIMs). The activation can involve complex end-user operations like scanning a QR-code or user identification via proprietary authentication steps that are MNO-dependent. The present disclosure simplifies this procedure by making the MNO's Entitlement Configuration Server (ECS) the entry point and orchestration element for the eSIM activation procedure. The end-user authentication is presently based on the standard OpenID framework and control of the authentication and activation process is handled using standard techniques like HTTP redirect.

eSIMs are integrated, pre-installed SIM chips that cannot be removed from a device. The information contained on eSIMs may be industry-standard compliant and re-writable by all MNOs, meaning that an end-user can decide to change the assigned MNO and initiate physical steps to switch. A new SIM card may not be included because no physical swapping of SIM cards is possible given that the device is dynamic and embedded.

In order to activate the eSIM on a new device, an end-user presently performs a physical task such as scanning a OR Code or activating the device at a physical store location. No process is yet available to perm it an end-user the freedom of choice to switch MNOs at will without physically possessing a MNO-specific OR code or otherwise physically present themselves at an MNO store location in order to have the device eSIM switched on. The present disclosure simplifies this procedure by making the MNO's Entitlement Configuration Server (ECS) the entry point and orchestration element for the eSIM activation procedure.

Methods and systems disclosed herein provide for the initiating, authenticating, authorizing, and activating of an eSIM-containing device through the MNO's entitlement configuration server (ECS) to fully automate the eSIM connection process and permit MNOs to offer more convenient opportunities to their customers for connecting their devices to the Internet and to each other without the need for physical OR codes or the need to physically present themselves at a MNO's store location. This remote fully automated eSIM provisioning through an ECS allows the end-user to designate a MNO of choice quickly, identify him/herself and activate the eSIM without the need to rely on physical codes or a physical presence in a MNO's store location.

Given that consumer devices will demand more dynamic pull and flow to process electronic profile requests rather than the passive push mode of machine-to-machine (M2M) technology applications, the full automation of eSIM connectivity and activation through an ECS may allow the end-user to receive desired access quickly with little associated cost, to switch MNOs faster, to find the least expensive MNO with the best coverage, to spend less time doing the tasks they need to do with their carrier companies, and to connect multiple eSIM-containing devices, including Internet of Things (IoT) devices in a seamless manner. Examples in the present disclosure permit fully automated accessible activation of consumer eSIM devices, such as laptops, cell phones, tablets, watches and any other mobile device, as well as any eSIM-containing Internet of Things (IoT) device, through an ECS. The MNO may also associate multiple devices through inter- and intra-connections by imbedding the ECS into their provisioning and eSIM activation flows. These processes and products provide alternative solutions to diversified devices, MNOs, and networks around a centralized ECS process. These processes are amenable to being immediately added to existing ECS network elements already used for a primary device's entitlement and companion/secondary eSIM management and may also be utilized to on-board new eSIM devices and provided inter-and intra-connections as desired by end-users.

Turning now to FIG. 1, an illustrative flow diagram 100 shows a process flow for activating an eSIM device 101 without any end-user hardware dependencies in accordance with one or more examples of the present disclosure. In one or more implementations, the eSIM device 101 may include an original equipment manufacturer (OEM) eSIM activation application (App) 102. The eSIM device 101 may also contain a device OEM phone number mapping service 103 which may be activated during the process "flow," exemplified as shown in FIG. 1. Either pathway of OEM eSIM activation App 102 or device OEM phone number mapping service 103 may then be utilized to get to an entry point of a Mobile Network Operator (MNO) and a Designated Entitlement Configuration Server (ECS) 104. The ECS 104 is the anchor point for the flow session that may be carried out by, for example, hypertext transfer protocol (HTTP). The ECS 104 facilitates the integration of an OpenID/OIDC authentication server 105 of the MNO in order to associate the always-connected device and the end-user with an MNO subscription.

From the point at which the ECS 104 facilitates the integration of an OpenID/OIDC authentication server 105, as illustrated in FIG. 1, a series of operations occur that can be accomplished sequentially, consecutively, or alternatively and include GET commands and messaging parameters (three shown —109, 111, 116) and other redirect instructions (two shown—110, 114). The initial GET commands and messaging parameters to the ECS are answered with "302 Found" instructions 109 (a hypertext transfer protocol (HTTP) redirect response status code) in order to imbed into the flow an Open ID connect (OIDC) server with proper parameters 111 (an identification and authentication standard). The resulting OpenID access token is then returned to the ECS (116) via a standard "302 Found" (115) exercised by the OIDC server. The other redirect instructions 110, 114 may be related to IMEI (international mobile station equipment identity) and a response to the integrated circuit card identifier request (ICCID). The GET commands and messaging parameters 109, 111, 116 and other 302/redirect instructions 110, 114 may vary depending on the details of the MNO's OIDC platform. During these operations, these communications protocols synchronize with the ECS 104 and may be further processed by specific OpenID Connect (UDC) authentication servers 105.

In operation, related process operations include checking mobile plans authorization and ICCID status 119 as well as validation of access tokens and GET end-user information via the international mobile subscriber identity (IMSI) 117. Once the appropriate tokens have been authenticated by one of the operations through the ECS 104, the operation 120 may be redirected 121 to an interface, e.g. an MNO eSIM Plan Selection Web Portal 123, where the end-user 113 may select one of the proposed data plans 125. Once selected, the end-user 113 is shown the activation result 128. The subscription and plan are activated 127 and a reserve communication profile is stored 126. At the request of the Web Portal or the ECS, the business support system (BSS) subscription management processes activates the plan and stores the result 129.

In operation, a pathway also shows that a subscription manager data preparation interface (SM-DP+) 124 is engaged 124. In general, SM-DPs are the entities which operate to securely encrypt the MNO credentials and communication profile ready for over the air installation within the eSIM. Response status on the subscription activation queries are then made, checked, and responded to at operation 130 and the activation code and applicable identifiers are relayed. The MNO's communication profile is then fetched from the SM-DP+131 and transmitted to the eSIM 132. At that point, the eSIM 132 is connected with the cellular data service 133 and a cellular data network 134 of the MNO.

Figure 2:
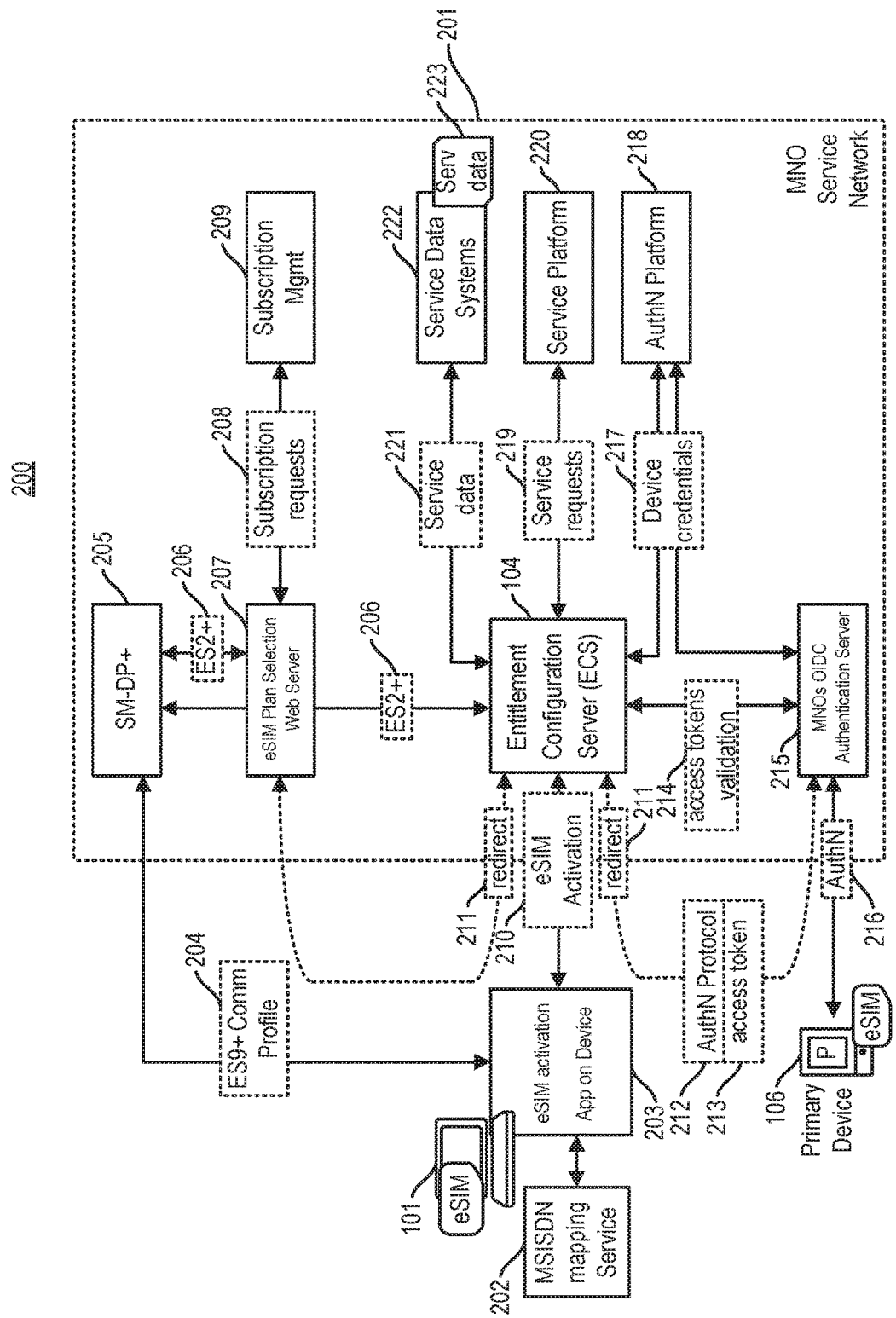
FIG. 2. is an illustrative flow diagram of an example process flow where a Designated Entitlement Configuration Server (ECS) is the primary entry and orchestration point on an MNO side for eSIM device activation.

FIG. 2. is an illustrative flow diagram 200 of the similar process flow where the Entitlement Configuration Server (ECS) is the primary entry point. The ECS 104 facilitates the integration of the OIDC authentication server 215 of the MNO in order to associate the always-connected device and the end-user with an MNO subscription.

In operation, the ECS 104 acts as the control element for the activation process flow. This structure provides several alternative pathways by which the ECS 104 can process the flow as the primary entry point. Once the eSIM device 101 is turned on and the eSIM activation application is invoked, a mobile station international subscriber director number (MSISDN) mapping service 202 may identify the MNO behind the end-user's MSISDN. The MNO's entry point for the activation procedure (the MBO ECS) is then also determined and activated. The MSISDN mapping service 202 is a uniquely identifying subscription number in a mobile network and maps the telephone number or other modality identification protocol to the SIM card.

In operation, an application on an eSIM device sends an activation request 210 to the ECS 104. The ECS 104 redirects 211 the application to the MNO's OIDC Authentication Server 215 in order to properly identify the end-user behind the activation request. The Redirect request 211 includes the proper authentication request 212 to be processed by the OIDC Authentication Server 215. The OIDC Authentication Server 215 can involve the end-user's primary device 106 with an authentication request 216 (can be of several methods like One-Time-Password) or can request the end-user for his/her MNO credentials 217, validated with the MNO's Authentication platform 218. After successful authentication, the OIDC Authentication Server 215 returns an access token 213 to the ECS, which is used to validate 214 the authentication procedure and obtain additional information on the end-user from the OIDC Authentication Server. The ECS can then verify the eligibility and subscription attributes 221 of the end-user by querying the proper Service Data System 222 at the MNO. The MNO's eSIM Plan Selection Web Server 207 is introduced in the flow by the ECS using another redirect request 211. The eSIM Plan Selection Web Server 207 displays available plans to the end-user and carries out subscription requests 208 to the MNO's Subscription Management System 209. The communication profile for the eSIM can be reserved at that point in the Web Server 207 logic using ES2+commands 206 to the SM-DP+205, or can be reserved by the ECS 104 when the Web Server 207 sends back its response to the ECS 104.

In operation, subscription requests 208 may be processed generating a subscription management service 209 or another ES2+ may be initiated routing the process to the ECS 104. Another process indicates that the eSIM Activation web server 207 connects directly to the ECS 104 through a redirect protocol 211. The ECS 104 may then engage in multiple sequential, consecutive, or alternative processes whereby service data 221 may be transmitted to service data systems 222 where service data are stored 223. Alternatively, service requests 219 may be processed and forwarded to a service platform 220. Alternatively, MNO credentials 217 may be processed and forwarded to an authentication platform 218. At that point, the process also flows to a carrier open authorization Open ID (ODIC) server 215 for authentication 216.

After a carrier open authorization OpenID (ODIC) server is authenticated, the eSIM on the primary device 106 is ready for use. An alternative pathway to activate 210 the eSIM on the primary device 106 is to utilize an eSIM compatible device management solution linking the application on the eSIM device to the ECS entitlement server 104. A redirect protocol then routes the process to access token validation 214 and then to the carrier OAuth/ODIC server 215 or alternatively to an authentication (AuthN) Protocol 212 with an access token 213 and then to the carrier OAuth/ODIC server 215. The MNO service network processes are indicated by the dashed box 201. The subscription on the eSIM device 203 is then activated via the device's application by downloading a bound profile package (SM-DP+ communication profile) 204. The communication profile is requested through the SM-DP+ES9+ interface 205. The MNO prepares the reserved profile in the SM-DP+205 and sends it to the eSIM containing device.

Figure 3:
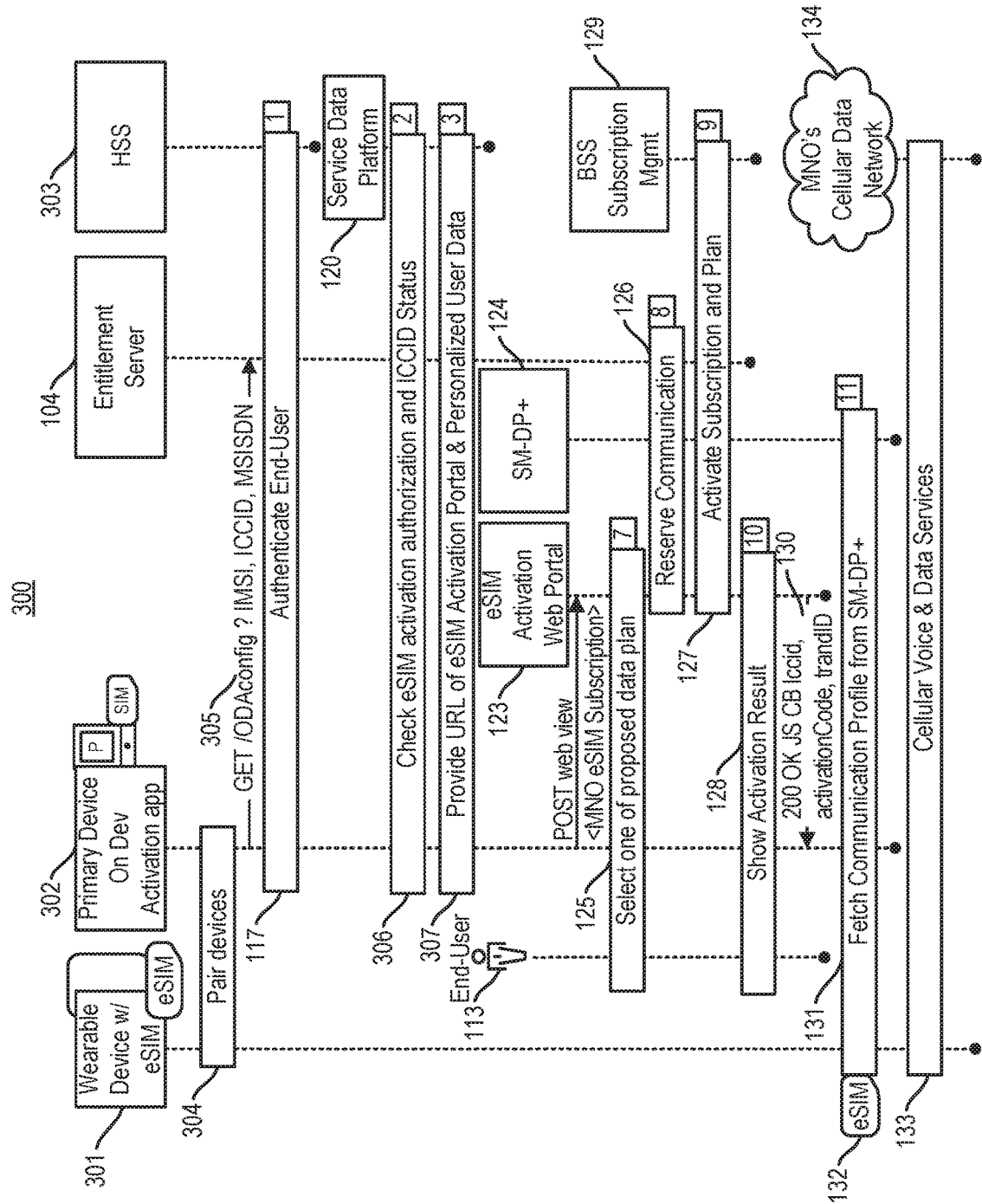
FIG. 3. Is an illustrative flow diagram of an example process flow similar to that shown in FIG. 1 but where wearable devices including eSIMs are exemplified along with primary devices on developer activation applications.

Turning now to FIG. 3, an illustrative flow diagram 300 shows a process flow similar to that shown in FIG. 1, but where wearable devices comprising eSIMs 301 are exemplified along with primary devices on developer activation applications 302. These primary devices include an eSIM. By way of example, they may be on stand-alone "always-connected" devices, mobile devices exemplified by cellular phones, laptops, tablets, watches, glasses, and connected devices, Internet of Things (IoT) devices, any Internet-linked server linked to an eSIM device, such as an ACTP server or a virtual cloud server or any other eSIM containing and/or connected moiety. One or more devices 301 or 302 may be paired as at block 304.

In operation, alternatively the process flow can be initiated through a home subscriber server (HSS) 303 which provides authentication, authorization, policy control and routing information to packet gateways for Wi-Fi access. It performs authentication of SIM devices directly to the HSS 303 which may be located within a subscriber home network. The HSS 303 contains a subscriber and authentication credential database for the HSS subscriber to access a wireless local area network (WLAN) interworking service. From this point, the process may initiate a GET process for, by way of example, an ODAconfig (Oracle database appliance configurations), IMSI, ICCIS, or MSISDN protocol 305 after which the authentication of the end-user 117 may occur in a manner similar to the one shown in FIG. 1. eSIM activation, authorization, and ICCID status may be checked at block 306. A URL of eSIM activation portal and personalized user data may then be provided at block 307.

An example of the implementation is a Designated Entitlement Configuration Server (ECS 104) using the cellular data network 134 of MNO for the activation of consumer companion devices 101 or 106, such as connected watches or tablets through the user mobile phone or other mobile devices. The use of the ECS solution to activate eSIM 101 or 106 in connected data devices permits automatic eSIM device provisioning. The ECS 104 is used to coordinate the flow between the user's primary device, the device vendor's systems and the mobile operator's systems (including eSIM server).

eSIM activation and cellular subscription selection by a consumer to a Carrier of choice follows specifications from GSMA (Groupe Speciale Mobile Association), the trade body representing Mobile Network Operator (MNOs), which are cellular service providers. GSMA, developed within the Remote SIM Provisioning (RSP) working group of GSMA.

The flow set forth by way of example herein is designed to avoid modifying the eSIM device OEM applications with minor impacts to the MNO. This implies a number of enhancements to DEG as indicated by way of example in the flow corresponding to any one of FIGS. 1, 2, and/or 3.

The ECS 104 may be eSIM device's mobile plan activation application or application programing interface (API). The ECS 104 may be the anchor point for the hypertext transfer protocol (HTTP) session initiated by the device's application. The ECS 104 may use a series of "302 Found" and HTTP Redirects to bring the user through the different steps. The ECS may integrate the OpenID (an identification and authentication standard) authentication server in order to associate the always-connected device and end-user with an existing Mobile Operator subscription.

A person of ordinary skill in the art will readily appreciate that any eSIM containing moiety may be provisioned by the exemplified flow processes using an Entitlement Configuration Server (ECS). Such devices include but are not limited to laptops, cell phones, printers, watches, glasses, tablets, IOT components, servers, cloud devices, virtual components, applications, and devices without limitation. Products and processes may be exemplified for the activation and provisioning of "flow" on, among, and between an entitlement configuration server (ECS) and an embedded subscriber identity module ("eSIM") by way of stand-alone "always-connected" devices and/or mobile devices exemplified by cellular phones, laptops, tablets, watches, glasses, and connected devices, Internet of Things (IoT) devices, any Internet-linked server linked to an eSIM device, such as an ACTP server or a virtual cloud server such that one or more of these moieties may provide connection to, among, or between these eSIM containing devices.

Devices, moieties, and systems may refer to one or more device, components, or group of components that when assembled result in a product that may be commercially available and/or otherwise for manufactured or for sale. Examples of products may include computing devices, storage devices, processors, memory, network devices, consumer devices, enterprise equipment, and the like. Products may also include services or a group of services. For example, a financial product may include a banking transaction, acquisition, etc. Similarly, a healthcare product may include the transmission of patient records. Thus, as used herein, the term product may refer to both physical devices as well as industry specific services.

FIGS. 1-3 show exemplary implementations of devices comprising processors including representations of cell phones and computers. These computing systems may be used to implement aspects of the present disclosure, such as an orchestrator, a gateway manager, a cloud monitor, a local storage, a cloud-based storage, or any other device, process, or method that may be used implementing the systems and methods for managing data discussed herein. These example computing systems may include one or more central processing units (singular "CPU" or plural "CPUs") or "processor(s)" disposed on one or more printed circuit boards (not otherwise shown).

One of ordinary skill in the art will recognize that the example implantation of a computing system may be a cloud-based server, a server, a workstation, a desktop, a laptop, a netbook, a tablet, a smartphone, a mobile device, and/or any other type of computing system in accordance with one or more example embodiments In certain implementations, processes may include activation of embedded subscriber identity module (eSIM) devices through an entitlement configuration server (ECS).

In certain implementations, the processes and methods are carried out in a non-proprietary basis with respect to the end-user devices, mobile operators, and carriers. The processes may also be carried out on different devices, carriers, and/or networks through the ECS without the use of moieties such as a QR code or physical activation service. In certain implementations the processes and methods may be entirely automated by the process exemplified in the representative implementations shown in FIGS. 1-3.

Figure 4:
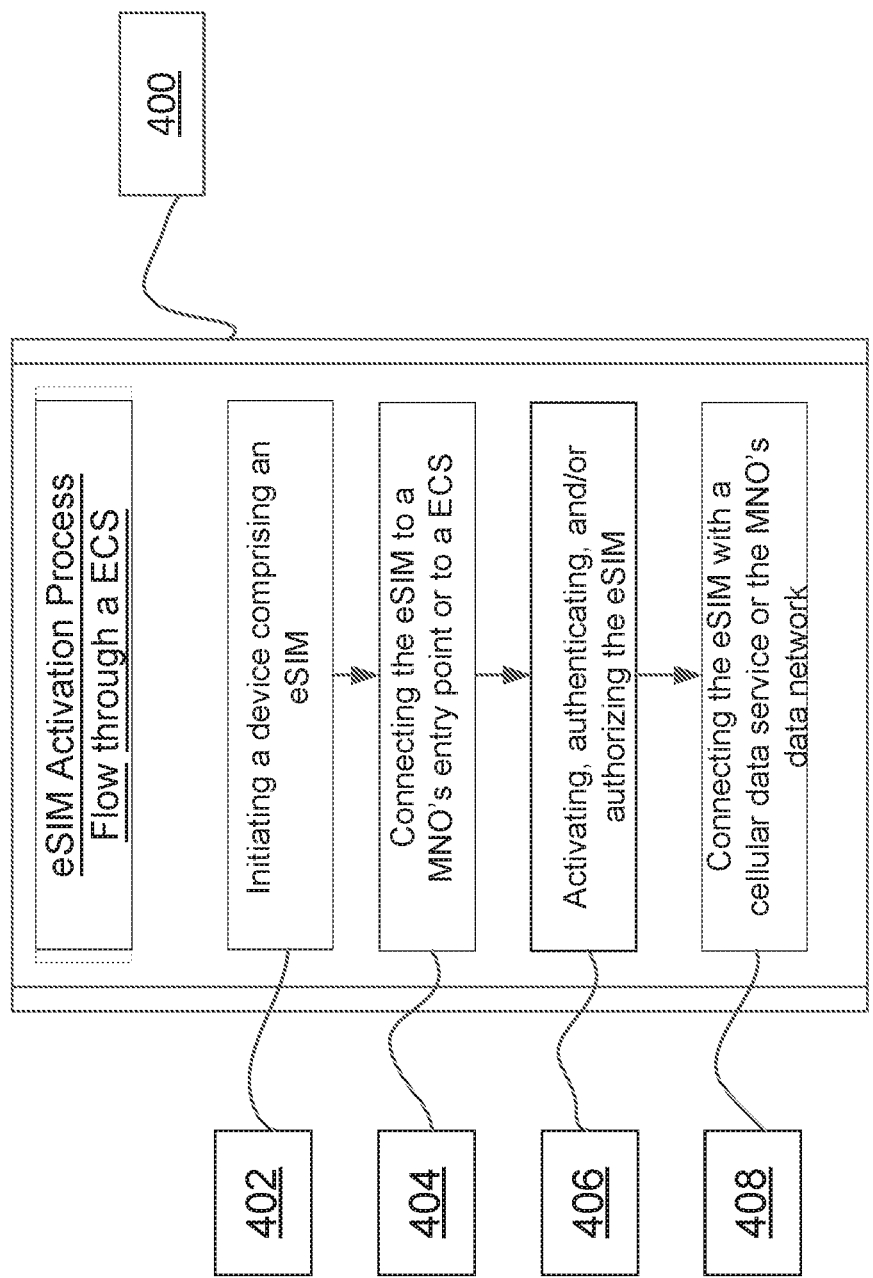
FIG. 4. Is an illustrative flowchart depicting an example method for activating an eSIM containing device using a Entitlement Configuration Server (ECS) as the primary entry point on the MNO side of the communication/activation process.

FIG. 4 shows, in certain implementations, a method 400 that may include activating a device comprising an eSIM by imbedding a MNO's Entitlement Configuration Server (ECS) process into the eSIM activation flow. This may encompass one or more operations carried out on different devices, carriers, or networks. Further, the eSIM-containing devices selected from the group consisting of one or more of laptops, cell phones, printers, tablets, glasses, watches, servers, cloud devices, and an Internet of Things (IoT) device, and wherein the ECS connects one or devices through the ECS process. The process may also include activating an eSIM device without any end-user hardware dependencies. End-user hardware dependencies encompass, for example, in-store product assistance or OR Codes that the end-user must scan or activate prior to establishing a connection with the MNO system.

In certain implementations, the method 400 for activating an eSIM device without any end-user hardware dependencies may comprise initiating (block 402) a device comprising an eSIM , connecting (block 404) the eSIM to a Mobile Network Operators (MNOs) entry point or to a designated entitlement configuration server gateway (ECS), activating, authenticating, or authorizing (block 406) the eSIM, and/or connecting the eSIM with a cellular data service or the MNO's data network. The method 400 may also comprise one or more of the initiating, connecting, or activating steps carried out on different devices, carriers, or networks. The method 400 may also include connecting (block 408) the eSIM with a cellular data service or the MNO's data network.

In certain implementations, the method 400 may comprise a device comprising an embedded subscriber identity module (eSIM) for sending a command to an eSIM cooperating with a communications terminal, the method comprising communicating through a designated entitlement configuration server (ECS). The method 400 may also comprise or encompass a device comprising an embedded subscriber identity module (eSIM) for activating an eSIM device without any end-user hardware dependencies. The method 400 may also be used to connect an eSIM to a Mobile Network Operators (MNOs) entry point or to a designated entitlement configuration server (ECS), to activate, authenticate, or authorize the eSIM, and to connect the eSIM with a cellular data service or the MNO's data network.

Figure 5:
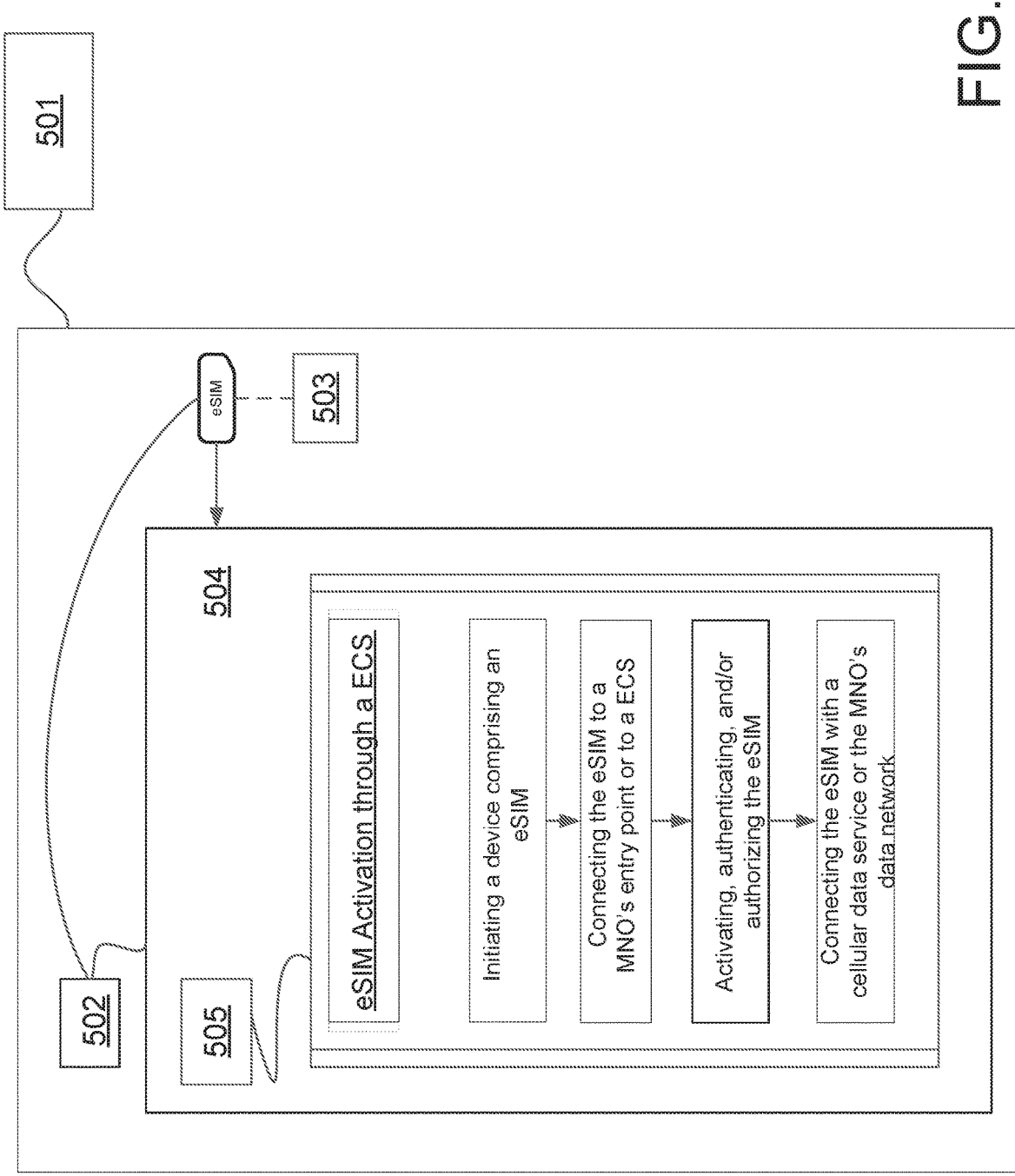
FIG. 5 is a computing system, according to one or more examples of the present disclosure.

FIG. 5 shows a computing system 501, according to one or more examples of the present disclosure. Certain implementations include a non-transitory computer readable medium 504 that may comprise computer executable instructions 505 stored thereon that, when executed by one or more processing units 502 in the computing system 501, cause the one or more processing units to activate an eSIM 503 device or moiety through a designated entitlement configuration server (ECS).

In certain implementations, the non-transitory computer readable medium 504 may comprise instructions 505 stored thereon that, when executed by the one or more processing units 502, cause the one or more processing units to update the eSIM 503 to an activated state.

In certain implementations, the non-transitory computer readable medium 504 may be linked to, embedded in, or connected to an eSIM-containing device selected from the group consisting of one or more of laptops, cell phones, printers, tablets, glasses, watches, servers, cloud devices, and an Internet of Things (IoT) device that is activated, authenticated, and/or connected through a designated entitlement configuration server (ECS).

In certain implementations, the computing system 501 may comprise a non-transitory computer readable medium 504 comprising one or more computer executable instructions stored thereon that, when executed by one or more processing units in a source system, cause the one or more processing units to activate an eSIM device through a designated entitlement configuration server (ECS).

The non-transitory computer readable medium 504 may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

In certain implementations, the computing system 501 illustrated in FIG. 5 may comprise a processing unit 502, an eSIM 503, and an application comprising a executable instructions 505 that causes one or more processing units to activate an eSIM device through a designated entitlement configuration server (ECS) and it may also comprise an eSIM-containing device selected from the group consisting of one or more of laptops, cell phones, printers, tablets, watches, glasses, servers, cloud devices, and Internet of Things (IOT) devices, wherein the eSIM containing device is activated, authenticated, and/or connected through a designated entitlement configuration server (ECS) and also connects an MNO entitlement server (ES) process into the eSIM activation flow process. The activation flow process is the method by which the eSIM activation is carried out, a shown, for example in block 402-408 of FIG. 4. Illustrative activation flow processes are represented by FIGS. 1-5 in general and FIGS. 1-3 in greater detail.

In certain implementations, a system may also comprise activation of an eSIM device without any end-user hardware dependencies, connection of the eSIM to a Mobile Network Operators (MNOs) entry point or to a designated entitlement configuration (ECS), authentication or authorization of the eSIM, activation of the eSIM, and verification of the connection of the eSIM with a cellular data service or the MNO data network.

The foregoing description, for the purpose of explanation, uses specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this closure be defined by the claims and their equivalents below.

What is claimed is:

1. A method for activating an embedded subscriber identity module (eSIM) device comprising:
   initiating at least one device comprising an eSIM, wherein the eSIM is rewritable by any of a plurality of Mobile Network Operators (MNOs) such that a user can select any of the plurality of MNOs as an assigned MNO;
   initiating an eSIM activation application on the at least one device comprising the eSIM, wherein an entitlement configuration server (ECS) redirects at least one authentication request for a user associated with the eSIM to an authentication server associated with the assigned MNO such that the user, after successful authentication of the user to the assigned MNO, can select the assigned MNO via the connection to the ECS, and wherein an ECS in each of the plurality of MNOs is a primary entry and orchestration point for eSIM device activation in each MNO and performs multiple orchestration operations in parallel effectuating authentication;
   downloading a profile package, bound to the eSIM, to the at least one device comprising the eSIM via the eSIM activation application, wherein the at least one device receives the bound profile package through a subscription manager data preparation interface of the assigned MNO;
   automatically activating the eSIM via the eSIM activation application based on the profile package to facilitate over the air installation within the eSIM, wherein automatically activating the eSIM comprises:
   connecting the eSIM with a cellular data service or a data network of the assigned MNO based on the activation of the eSIM such that provisioning the eSIM through the ECS allows the user to switch selection of the assigned MNO for the eSIM to a different MNO from the plurality of MNOs, wherein switching the selection enables the different MNO to rewrite the eSIM for a different cellular data service or a data network of the different MNO to activate the eSIM.

2. The method of claim 1, further comprising:
   authorizing the eSIM via the connection to the ECS, and wherein one or more of the initiating, connecting, or activating is carried out on different devices, carriers, and/or networks.

3. The method of claim 1, wherein the ECS is an anchor-point for a session initiated by the eSIM activation application.

4. The method of claim 1, wherein the ECS facilitates an integration of an open authorization authentication server of the MNO in order to associate the eSIM with an MNO subscription.

5. The method of claim 1, wherein the at least one device is selected from the group consisting of: a laptop, a cell phone, a printer, a tablet, glasses, a watch, a server, a cloud device, and an Internet of Things (IOT) device.

6. The method of claim 1, wherein the at least one device comprising the eSIM is connected through the ECS and an MNO process is connected into an eSIM activation flow process.

7. The method of claim 1, further comprising activating the at least one device comprising the eSIM device without any end-user hardware dependencies.

8. A non-transitory computer readable medium comprising computer executable instructions stored thereon that, when executed by one or more processing units, cause the one or more processing units to:
   connect an embedded subscriber identity module (eSIM) device to an entitlement configuration server (ECS), wherein the eSIM is rewritable by any of a plurality of Mobile Network Operator (MNOs) such that a user can select any of the plurality of MNOs as an assigned MNO;
   initiate an eSIM activation application on the eSIM device, wherein the ECS redirects at least one authentication request for a user associated with the eSIM to an authentication server associated with the assigned MNO, wherein the assigned MNO is selectable via the connection to the ECS after successful authentication of the at least one authentication request, and wherein an ECS in each of the plurality of MNOs is a primary entry and orchestration point for eSIM device activation in each MNO and performs multiple orchestration operations in parallel effectuating authentication;
   download a profile package bound to the eSIM to the eSIM device, wherein the eSIM device receives the profile package through a subscription manager data preparation interface of the assigned MNO; and
   automatically activate the eSIM device based on the profile package to facilitate over the air installation within the eSIM to connect the eSIM device with a cellular data service or a data network of the assigned MNO, wherein provisioning the eSIM device through the ECS allows the user to switch selection of the assigned MNO for the eSIM to a different MNO from any of the plurality of MNOs, wherein switching the selection enables the different MNO to rewrite the eSIM for a different cellular data service or a data network of the different MNO to activate the eSIM.

9. The non-transitory computer readable medium of claim 8, further comprising instructions stored thereon that, when executed by the one or more processing units, cause the one or more processing units to update the eSIM to an activated state.

10. The non-transitory computer readable medium of claim 8, wherein the non-transitory computer readable medium is to be linked to, embedded in, or connected to an eSIM-containing device selected from the group consisting of one or more of laptops, cell phones, printers, tablets, glasses, watches, servers, cloud devices, and an IOT device that is activated, authenticated, and/or connected through a ECS.

11. The non-transitory computer readable medium of claim 8, where the ECS is an anchor-point for the activation, authentication and/or authorizing process step.

12. The non-transitory computer readable medium of claim 8, where the ECS facilitates the integration of the open authorization authentication server of the MNO in order to associate the eSIM with a Mobile Network Operator (MNO) subscription.

13. A system comprising:
one or more processing units; and
a non-transitory computer readable medium communicatively coupled to the one or more processing units and comprising computer executable instructions stored thereon that, when executed by the one or more processing units, cause the one or more processing units to:
connect an embedded subscriber identity module (eSIM) device to at least one entitlement configuration server (ECS), wherein the eSIM is rewritable by any of a plurality of Mobile Network Operators (MNOs) such that a user can select any of the plurality of MNOs as an assigned MNO;
initiate an eSIM activation application on the eSIM device, wherein the ECS redirects at least one authentication request for a user associated with the eSIM to an authentication server associated with the assigned MNO such that the user, after successful authentication of the user to the assigned MNO, can select the assigned MNO via the connection to the ECS, and wherein an ECS in each of the plurality of MNOs is a primary entry and orchestration point for eSIM device activation in each MNO and performs multiple orchestration operations in parallel effectuating authentication;
download a profile package bound to the eSIM to the eSIM device, wherein the eSIM device receives the profile package through a subscription manager data preparation interface of the assigned MNO; and
automatically activate the eSIM device based on the profile package to facilitate over the air installation within the eSIM to connect the eSIM device with a cellular data service or a data network of the assigned MNO, wherein provisioning the eSIM device through the ECS allows the user to switch selection of the assigned MNO for the eSIM to a different MNO from any of the plurality of MNOs, wherein switching the selection enables the different MNO to rewrite the eSIM for a different cellular data service or a data network of the different MNO to activate the eSIM device.

14. The system of claim 13, further comprising an eSIM-containing device selected from the group consisting of one or more of: laptops, cell phones, printers, tablets, watches, glasses, servers, cloud devices, and Internet of Things (IOT) devices, wherein the eSIM-containing device is activated, authenticated and/or connected through the ECS.

15. The system of claim 13, wherein the non-transitory computer readable medium comprises further computer executable instructions stored thereon that, when executed by the one or more processing units, cause the one or more processing units to connect an MNO process into the eSIM activation flow through the ECS.

16. The system of claim 13, wherein the ECS is an anchor-point for the activation of the eSIM device.

17. The system of claim 13, where the ECS facilitates the integration of the open authorization authentication server of the MNO in order to associate the eSIM with an MNO subscription.

18. The system of claim 13, wherein the non-transitory computer readable medium comprises further computer executable instructions stored thereon that, when executed by the one or more processing units, cause the one or more processing units to:
activate the eSIM device without any end-user hardware dependencies;
authorize the eSIM; and
verify the connection of the eSIM with a cellular data service or the data network of the assigned MNO.

19. The system of claim 18, where the ECS is the anchor-point for the activate, authenticate and/or authorization instructions.

20. The system of claim 18, where the ECS facilitates the integration of the open authorization authentication server of the MNO in order to associate the eSIM with an MNO subscription.

21. The method of claim 1, where the eSIM is industry standard compliant and rewritable by any of the plurality of Mobile Network Operators (MNOs) operating in compliance to the industry standard.

22. The method of claim 1, wherein the eSIM activation application establishes a connection between the eSIM and the ECS associated with the assigned MNO selected by the user from the plurality of MNOs.

* * * * *